Figure 1:
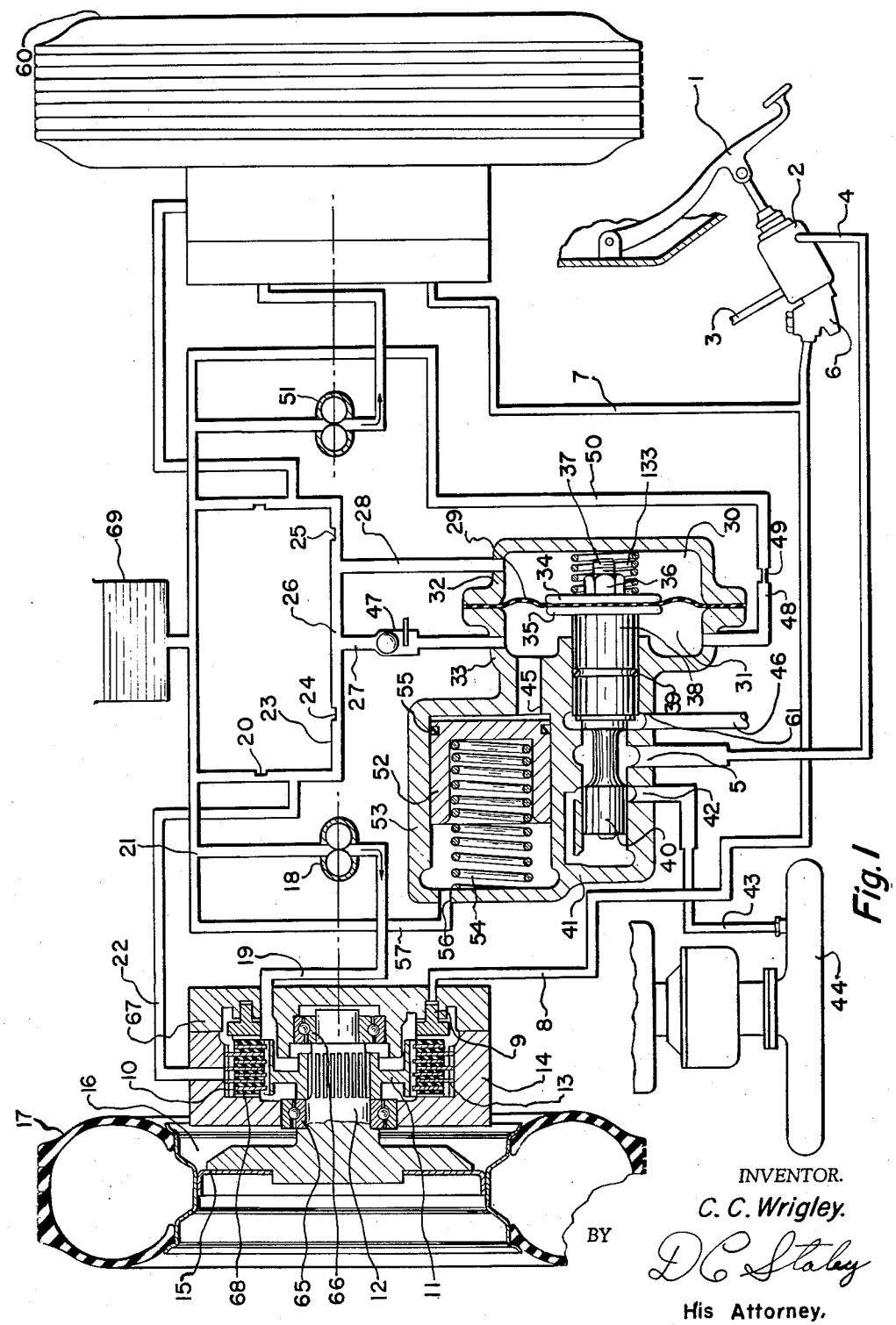

INVENTOR.
C. C. Wrigley.
BY D C Staley
His Attorney.

United States Patent Office 3,004,801
Patented Oct. 17, 1961

3,004,801
SYSTEM TO CONTROL WHEEL LOCKING DURING BRAKING
Clifford C. Wrigley, Grosse Pointe Woods, Mich., assignor to General Motors Corporation, Detroit, Mich., a corporation of Delaware
Filed June 30, 1958, Ser. No. 745,600
8 Claims. (Cl. 303—21)

This invention relates to a vehicle brake and more particularly to a system for controlling wheel locking during braking of the vehicle.

It is a known fact that during the braking of a vehicle when the wheel of a vehicle is skidding on the road, it provides less friction and less stopping effort on the vehicle than the moment before the wheel begins to skid. It is, therefore, understood that the maximum braking effort on a vehicle may be accomplished if skidding is prevented. It is also advantageous to prevent skidding as it adds to the life of the tires. It is also a known fact that a wheel which is rotating at all times is necessary for proper steering of the vehicle.

It is an object of this invention to provide a device for controlling wheel locking during braking of a vehicle.

It is another object of this invention to provide an anti-skid device which operates in response to the fluid pressure of the cooling fluid for the vehicle brakes.

It is a further object of this invention to provide a pressure responsive device to prevent wheel skidding through a controlling means for the power booster unit in operating the vehicle brakes.

It is a further object of this invention to provide an anti-skid device operating in response to fluid pressure of wheel operated pumps. The wheel operated pumps operate directly from the rotation of the wheels. The pressure responsive anti-skid device controls the vacuum or pressure input to a power booster which aids in the operation of the vehicle brakes.

These objects are accomplished as shown by a pressure responsive device which controls the vacuum input to a power booster unit. The vehicle brakes are of a conventional type whereby a fluid pump is operated directly upon rotation of the vehicle wheel. The output of these fluid pumps discharge into an equalizing portion of a conduit means. From this equalizing portion of conduit means two outlets are provided. These outlets lead into a chamber in the anti-skid control means. This chamber is separated by means of a diaphragm. The one side of this chamber is closed and has a spring operating directly against the diaphragm.

The chamber on the opposite portion of the diaphragm has an orifice outlet which leads back to the input side of a pump. A second outlet is provided to a piston-type accumulator which provides a building up of pressurized fluid within this accumulator. The opening from this accumulator to the diaphragm is open at all times. The diaphragm is also directly connected to a spool valve which controls three ports. One port leads to the vacuum on the engine, the second port leads to the vacuum input on the power booster, and the third port leads to the atmosphere.

Upon application of the brakes, if both pumps remain in rotation, the equalizing pressure chamber feeds equally into each side of the diaphragm. As the pressure is built up within this chamber on both sides of the diaphragm, the accumulator also builds up pressurized fluid. With equal pressure on both sides of the diaphragm, the diaphragm is then moved to the extreme left by a spring, thereby opening the manifold vacuum directly to the booster unit.

In event of skidding of one wheel, the pump on that wheel also stops rotating. The fluid on both sides of the diaphragm then escapes into the equalizing pressure chamber. However, the pressure on the accumulator side of the diaphragm has a check valve on the outlet circuit and thereby the pressurized fluid from the accumulator moves the diaphragm and the spool valve to the right. As the valve spool is moved to the right, the vacuum is cut off from the manifold to the booster unit and the connection of the booster unit is made directly to the atmosphere. With the decrease in output from the power unit, the applying force on the brakes is decreased and both wheels are then again permitted to rotate. Upon rotation of the wheels and the pumps, the pressure again becomes equalized on both sides of the diaphragm.

The drawings illustrating the invention show a schematic diagram of the braking system connected with the booster unit and manual pedal. One of the wheels and braking means is shown in cross section to illustrate the operation of the brakes. The anti-skid device is also shown in cross section with the ports connecting to the manifold, the booster unit and the atmosphere.

The drawings illustrate a conventional brake pedal 1 directly connected to a power booster unit 2. A conduit 3 is shown connecting the power booster unit to atmosphere. A second conduit is shown at 4 which is directly connected to the anti-skid device at the port 5. The power booster shown is a conventional vacuum operated booster, however, the booster unit may be of an air or hydraulic pressure type. The master cylinder 6 is connected on the lower end of the booster unit 2. Conduit means 7 and 8 are shown connected to the braking means. An annular wheel cylinder 9 is shown within the braking structure. The brake illustrated is that using the conventional disk type of friction means. The rotating disks are shown at 10 directly connected to a rotating member 11 which is spline connected to the wheel shaft 12. Wheel shaft 12 is rotatably mounted in bearing assemblies 65 and 66 which are mounted in stator members 14 and 67. The stationary disks 13 are directly connected to the stator member 14. The wheel shaft 12 is shown connected to the wheel 15. Wheel 15 is directly connected to the rim 16 and tire 17.

Both wheels and brake structures are of the same general type, although only one is shown in cross section.

The wheel shaft 12 is directly connected to pump 18. The pump 18 is for circulating the cooling fluid for the vehicle brakes. The pump 18 operates directly into a conduit 19. This pump 18 creates a pressure within the conduit 19 which leads into the braking structure. A restricted portion is provided in the conduit 22 leading from the braking structure at 20 to build up the pressure slightly. A portion of this conduit also leads back to the reservoir 69. The fluid for cooling the brake is fed into the inner periphery of the rotating disks and flows radially outward between the disks through grooves in the friction material 68 to provide cooling of the brakes. As the fluid leaves the braking structure, it returns to the low side of the cooling fluid pump 18 through a conduit 21.

On the outlet side of the braking structure another conduit is provided as shown at 23. An additional restriction is also placed in this conduit as shown at 24. This restriction provides a greater resistance to the fluid than the restriction 20. Up to this point both sides of the brake fluid system are symmetrical. The portion in the fluid conduit between the two restrictions 24 and 25 is a pressure equalizing chamber 26. Outlet conduits 27 and 28 are provided from this equalizing chamber. Both these outlets lead into the anti-skid device.

The anti-skid device is provided with a chamber with the diaphragm 29 within this chamber. This chamber is divided into two portions 30 and 31. The portion 30 has a spring 133 disposed between the diaphragm washer 34 and the casing 32. The diaphragm 29 is mounted about its outer periphery between the casing 32 and casing 33. The central portion of this diaphragm is mounted between two washers 34 and 35 which are held in position by a nut 36 on a bolt 37. The bolt 37 is directly connected to a cylindrical member 38 which extends partially into the valve chamber. This cylindrical member 38 is provided with a seal 39. The cylindrical member 38 is directly connected to the spool valve 40 which is housed completely within the valve housing 41.

Three ports are disposed in the valve housing. The port 42 is connected to conduit 43 which extends into the engine manifold 44. In the event the booster 2 is pressure operated, the pressure source would be located at 44. This conduit provides a means for connecting the vacuum of the manifold to the valve housing. A second port 5 is directly connected to the conduit 4 which leads into power booster unit 2. A third conduit 46 leads directly to the atmosphere.

The conduit 27 which leads from the equalizing chamber 26 is provided with a check valve 47. The check valve 47 will permit the flow of fluid from the equalizing chamber 26 into a portion 31 of the diaphragm chamber. The reverse flow from the diaphragm chamber to the equalizing chamber 26 is restricted by means of the ball check valve 47. An outlet from the diaphragm chamber 31 is provided by means of conduit 48 through orifice 49 and conduit 50 which returns the fluid to the low side of the fluid pump 51. The orifice 49 is quite small and thereby permits building up the pressure considerably within the portion of the diaphragm chamber 31. As the pressure within the portion of the diaphragm chamber 31 builds up, port 45 permits fluid to pass into cylinder 53 and move the piston 52 axially against the spring 54. A seal 55 is provided on the piston 52 to prevent any leakage of fluid by the piston. The back side of piston 52 is free for movement because the outlet port 56 leads into conduit 57 to the low side of the fluid pump 18.

This drawing thereby illustrates the pressure-responsive anti-skid device directly connected to the fluid cooling system of a vehicle brake. The anti-skid device is directly responsive to the outlet of the pumps 18 and 51 and operates on the control means for the pressurizing of the brake applying fluid. This is accomplished by a secondary control on the operation of the booster unit. The booster unit is directly connected to the manual operating brake lever 1.

The anti-skid device operates in this manner: As lever 1 is depressed, the booster unit 2 is actuated. This provides pressure within the master cylinder 6 and the conduits 7 and 8 which lead to the braking structure. The pressure within the conduit 8 actuates the annular piston 9 and thereby compresses the stack of friction disks 13 and 10. The compression of the disks 10 and 13 provides friction which retards rotation of the wheel 15. This provides a normal braking of the wheel 15 unless the tire 17 skids on the road surface. This may be due to the tire contacting a material with a low coefficient of friction or the brakes being applied excessively hard. The same situation is true for the tire 60 which is on the opposite side of the car.

The rotation of either of these tires and their corresponding wheel provides for the operation of the fluid pumps 18 and 51 which are directly connected. The constant rotation of pumps 18 and 51 provides for a pressurized fluid within the conduit on the high side of these pumps. Each of these pumps feed through their respective pressure restriction 24 or 25 into the equalizing chamber 26. The two outlets from the equalizing chamber 26 feed into the anti-skid device on opposite sides of the diaphragm 29. The conduit 28 leads into the portion 30 of the diaphragm chamber which has no outlet except the return passage of the fluid through conduit 28. The second conduit 27 leads from the equalizing chamber 26 into the anti-skid device in the portion 31 of the diaphragm chamber. This conduit 27 is provided with a check valve 47. The check valve 47 permits passage of fluid only in one direction and into the portion 31 of the diaphragm chamber. Upon an increased pressure within the portion 31 of the diaphragm chamber over the equalizing chamber 26, the check valve 47 will immediately close.

The pumps 18 and 51 develop a pressure in the equalizing chamber 26 which also builds the pressure up in the portions 30 and 31 of the diaphragm chamber. A pressure within the diaphragm chamber 31 causes a pressurized fluid to flow through the opening 45 and into the cylinder 53. This pressure forces the piston 52 against the spring 54 in this accumulator portion of the anti-skid device. The fluid on the spring side of piston 52 is permitted to flow out of port 56 through conduit 57 to the return side of pump 18. This process is continued until the pressure within the cylinder 53 becomes equalized with the back pressure of spring 54. Slight variations of pressure in the portion 31 of the diaphragm chamber are overcome by the constant discharge through orifice 49. It will be noted that at this point where the pressure is equal in the portions 30 and 31 of the diaphragm chamber that the spring 133 will bias the spool valve in the extreme left position. In this position of spool valve 40 the port 42, which is connected to the vacuum in the engine manifold 44, and port 5 both open and the booster unit is thereby directly connected to the manifold vacuum. With this condition present the operator actuates the brakes by the manual control lever 1 with the assistance of the booster unit 2.

If for any reason the tires 17 or 60 should fail to rotate, the corresponding pump which is driven by that wheel will also fail to rotate. If either of the pumps 18 or 51 fails to rotate, the pressure created by these pumps which is present in the equalizing chambers 26 immediately decreases. With a decrease in pressure in the equalizing chamber, the fluid within the portions 30 and 31 of the diaphragm chamber immediately tend to discharge into the equalizing chamber 26. The fluid within the portion 30 of the diaphragm chamber discharges through the conduit 28 into the equalizing chamber 26. Upon discharge of the portion 31 of the diaphragm chamber, the check valve 47 immediately closes. This immediately creates a higher pressure in the portion 31 of the diaphragm chamber and the pressurized fluid within the cylinder 53 of the accumulator discharges into the portion 31 of the diaphragm chamber. The decrease in pressure in the portion 30 of the diaphragm chamber causes the diaphragm and its connecting cylindrical member 38 to move axially to the right and compresses spring 133. If the skid or nonrotation of the wheel and its corresponding pump continues, the spool valve 40 will move completely to the right and thereby close off port 42. With the closing of port 42, ports 5 and 61 are in communication with each other. This, in turn, directly connects the conduit 4 of the booster unit to the atmosphere, and thereby renders the power booster unit 2 ineffective.

When the booster unit is ineffective, the force of the pressurized fluid in the master cylinder 6 decreases considerably. The pressure from the applying fluid from master cylinder 6 and against the wheel cylinder 9 and its corresponding wheel cylinder on its opposite wheel is reduced. The reduced pressure within the wheel cylinders then permits rotation of the wheels again. Upon rotation of both wheels the directly connected pumps 18 and 51 then build up the pressure within the equalizing chamber 26. This, in turn, builds up the pressure within the portions 30 and 31 of the diaphragm chamber and, in turn, places the booster unit 2 in operation again through the control of the valve spool 40.

The anti-skid device during the application of the brakes is automatic in controlling the skidding of the wheels. The friction between the tires and the road is controlled to give maximum braking effort. The wheels are also in rotation to provide proper steering. These conditions are controlled by the anti-skid device automatically, although the operator may have the brake pedal depressed under a skidding condition.

While the embodiment of the present invention as herein disclosed constitutes a preferred form, it is to be understood that other forms might be adopted.

What is claimed is as follows:

1. An anti-skid device for controlling the application of a vehicle wheel brake comprising in combination, vehicle wheels, each of said wheels connected to a shaft having a fluid cooling pump directly connected to said shaft, a braking means for controlling the rotation of said wheel, a wheel cylinder for applying said braking means, a manual control means assisted by a booster unit for operating a fluid displacement member, fluid conduit means connected to said fluid displacement member and said wheel cylinders, a means for controlling wheel locking by said braking means operating in response to fluid pressure from said fluid cooling pumps, said wheel locking control means comprising a diaphragm chamber in communication with said fluid pumps through conduit means, an accumulator in communication by conduit means with said diaphragm chamber on one side of said diaphragm, a check valve in the conduit means between said accumulator side of said diaphragm chamber and the output side of said pumping means to permit passage of fluid into said chamber only, a control orifice and conduit means between the accumulator side of said diaphragm chamber and the input side of said fluid pumps, a spring on the opposite side of said diaphragm biasing said diaphragm to decrease the volume on the accumulator side of said diaphragm chamber, a conduit means connecting said output side of said cooling pumps with the portion of said diaphragm chamber on said opposite side of said diaphragm, a member connecting said diaphragm to a valve spool, said valve spool controlling the vacuum to the power booster unit in response to pressure from said cooling pumps and thereby controlling the skidding of said wheels.

2. A vehicle braking means comprising in combination, vehicle wheels each of said wheels connected to a shaft and a fluid cooling pump, a braking means for controlling the rotation of said wheel, a fluid cylinder for actuating said braking means, a manual control means assisted by a booster unit for pressurizing fluid within a fluid displacement member, fluid conduit means connecting said fluid displacement member with said fluid cylinder, conduit means connecting said fluid cooling pumps of said wheels and having an equalizing pressure chamber, an anti-skid device having a diaphragm chamber, conduit means connecting said equalizing chamber to the first side of said diaphragm in said diaphragm chamber, a check valve in said conduit means for permitting fluid to flow into said diaphragm chamber only, an accumulator directly connected to said first side of said diaphragm chamber, an orifice for controlling the outlet flow of fluid from said first side of said diaphragm chamber and placing said chamber in communication with the low side of a fluid pump, conduit means placing the low side of a second fluid pump in communication with the low pressure side of said accumulator, a spring mounted on the opposite side of said diaphragm biasing said diaphragm in an extreme position and conduit means connecting this side of said diaphragm chamber with said equalizing pressure chamber, said diaphragm connected by a member to a spool valve, means for connecting the engine manifold to the vacuum valve chamber, a conduit connecting said vacuum valve chamber to the atmosphere, a third conduit connecting said vacuum valve chamber to the booster unit, said vacuum valve operating in response to the pressures in said diaphragm chamber and placing the booster unit in an inoperative condition when one of said wheels and its corresponding pump is in a non-rotating position when the vehicle is in motion.

3. A vehicle braking means comprising in combination, vehicle wheels each of said wheels connected to a shaft and a fluid cooling pump, a braking means connected to said wheel for controlling the rotation of said wheel, a fluid cylinder for actuating said braking means, a manual control means assisted by a booster unit for pressurizing fluid within a fluid displacement member, conduit means connecting said fluid displacement member with said wheel cylinder, a vehicle engine manifold, a vacuum valve housing, conduit means connecting said vehicle manifold with said vacuum valve housing, conduit means connecting said vacuum valve housing with said booster unit, conduit means adapted for connecting said vacuum valve housing with the atmosphere, a vacuum valve spool contained within said vacuum valve housing and connected to a diaphragm within an anti-skid device for selectively connecting said booster unit to atmosphere or said manifold, a fluid cooling system for cooling said vehicle braking means, including said pumping means, a conduit means connecting the fluid cooling pumps of said wheels, said conduit means having an equalizing chamber with a flow restriction on both sides of said equalizing chamber, a conduit means connecting said equalizing chamber to the first side of a diaphragm chamber, a spring mounted on the first side of said diaphragm in said diaphragm chamber biasing said diaphragm to an extreme position and mounted within said diaphragm chamber on said first side of said diaphragm, a second fluid conduit connecting the second side of said diaphragm chamber with said equalizing chamber and having a check valve for permitting flow of fluid into said diaphragm chamber only, an outlet conduit means provided with an orifice for placing said second side of said diaphragm chamber in communication with the low side of said fluid cooling pumps, an accumulator in communication with said second side of said diaphragm chamber for accumulating pressurized fluid, said diaphragm movement being responsive to accumulator pressure on said second side of said diaphragm and the equalizing chamber pressure on said first side of said diaphragm to control said vacuum valve for operating said booster unit.

4. A vehicle braking means comprising in combination, vehicle wheels each of said wheels connected to a shaft and a fluid cooling pump, a braking means connected to said wheels for controlling the rotation of said wheels, a fluid cylinder within said braking means for actuating said braking means, a manual control assisted by a power unit for pressurizing fluid within a fluid displacement member, conduit means connecting said fluid cylinder with said fluid displacement member, a vehicle engine manifold, a conduit means connecting said vehicle manifold with said power unit, a valve member operating within said conduit means, an anti-skid device, a diaphragm operating in a chamber within said anti-skid device and connected to said valve member, a fluid cooling system having a conduit means connecting the fluid pumps of said vehicle wheels, said connecting conduit means having a pressure equalizing chamber in communication with both sides of said diaphragm chamber of said anti-skid device, a spring on the one side of said diaphragm biasing said valve to an extreme position thereby placing said booster unit in communication with said manifold, conduit means placing the opposite side of said diaphragm chamber in communication with the low side of said fluid cooling pumps through an orifice for restricting the flow of fluid from said diaphragm chamber, a check valve in the inlet side of said opposite side of said diaphragm chamber for preventing return flow of fluid from said opposite side of said diaphragm chamber, an accumulator connected to said opposite side of said diaphragm chamber for accumulating a pressurized fluid for biasing said diaphragm in opposition to said spring when the pressure in said equalizing chamber is less than said diaphragm chamber, the pressure in said equalizing chamber thereby controlling the vacuum input in said power unit for controlling the skidding of said vehicle wheels.

5. A vehicle braking means for a plurality of wheels comprising in combination, fluid pressure means for actuating each of said plurality of vehicle brakes, manual control means assisted by a booster unit for pressurizing fluid in communication with said plurality of vehicle brakes, a source of vacuum, conduit means connecting said source of vacuum to said booster unit, a vacuum valve in said conduit means for controlling the operation of said booster unit, a fluid pump operated by each of said plurality of vehicle wheels, conduit means connecting each of said plurality of fluid pumps and having a fluid pressurizing chamber, an anti-skid device including a diaphragm chamber containing a diaphragm separating said chamber, conduit means connecting said pressurizing chamber to said diaphragm chamber on the first side of said diaphragm, conduit means connecting said pressurizing chamber to said diaphragm chamber on the second side of said diaphragm, an accumulator for connecting to said diaphragm chamber on the second side of said diaphragm, conduit means having restriction within said conduit connecting said second side of said diaphragm chamber to the low side of said fluid pumps, means connecting said diaphragm to said vacuum valve and thereby controlling the operation of said booster unit in response to the pressure in said diaphragm chamber.

6. Means comprising in combination, a plurality of vehicle wheels, hydraulic braking means for each of said plurality of vehicle wheels, a fluid system connected to each of said plurality of fluid braking means, means for pressurizing fluid within said fluid system operated by a manual control means and assisted by a booster unit, a source of vacuum, conduit means connecting said source of vacuum to said booster unit, a vacuum valve in said vacuum conduit means, a fluid pump operated by each of said plurality of vehicle wheels, conduit means connecting each of said fluid pumps and having a fluid pressurizing chamber, an anti-skid device having a control chamber containing a movable member, said movable member separating said control chamber in two portions, the first of said portions of said control chamber in said anti-skid device containing a spring for biasing said movable member to increase volume in said first portion, conduit means connecting said first portion of said control chamber with said pressurizing chamber, conduit means connecting said second portion of said control chamber in said anti-skid device with said pressurizing fluid chamber and having a check valve permitting flow of fluid into said anti-skid device only, an accumulator in communication with said second portion of said control chamber, conduit means having restriction means connecting said second portion of said control chamber to the low side of said plurality of fluid pumps, means for connecting said movable member to said vacuum valve thereby controlling the operation of said booster unit through the vacuum valve in response to the pressure in said pressurizing chamber.

7. A braking means for a vehicle having a plurality of vehicle wheels, hydraulic means for actuating a fluid brake for each wheel, a fluid system in communication with said plurality of fluid brakes, means for pressurizing fluid in said fluid system by a manual control means assisted by a booster unit, a source of power connected to said booster unit, a valve means for controlling the operation of said booster unit, a fluid pump for operation with each of the wheels, conduit means connecting each of said plurality of fluid pumps and having a pressurizing chamber, an anti-skid device including a control chamber containing a movable member, said movable member separating said control chamber into an equalizing pressure chamber equalizing with the change in pressure in said pressurizing chamber through conduit means, a delay chamber forming the second chamber by said diaphragm in said diaphragm chamber, conduit means connecting said pressurizing chamber with said delay chamber, said conduit means having a check valve to permit inward flow of pressurized fluid into said delay chamber only, conduit means connecting said delay chamber with said pumps, means for connecting said movable member to said valve means to thereby control the operation of said booster unit in response to the pressure in said equalizing presure chamber and said delay chamber.

8. A vehicle fluid brake comprising a plurality of the combination of a wheel and shaft, a fluid cooling pump connected to each of said shafts, conduit means for circulating a cooling fluid connected to said pumps, brake means connected to each of said wheels, a hydraulic wheel cylinder operating said braking means, manual control means assisted by a power unit for pressurizing fluid within a master cylinder, said booster unit including an input line adapted for connection with the engine vaccum, fluid conduit means connecting said braking means with said master cylinder, an anti-skid device operating in response to the pressure from said fluid pumps, a diaphragm within said anti-skid device with an accumulator directly connected to a first fluid chamber on one side of said diaphragm, a second chamber containing a spring operating on the opposite side of said diaphragm, conduit means connecting said pumps with said chambers, a check valve in the conduit means between said pumps and said first fluid chamber, a control orifice and conduit means connecting said first chamber and the input side of said pumps, a valve member connected to said diaphragm extending into a valve chamber, said valve member chamber located in the input vacuum line of said booster unit, said valve operated by said diaphragm in response to the pressure of said cooling fluid pumps and thereby controlling the vacuum input into the booster unit.

References Cited in the file of this patent

UNITED STATES PATENTS

| | | |
|---|---|---|
| 2,127,557 | Ells | Aug. 23, 1938 |
| 2,857,743 | Price | Oct. 28, 1958 |
| 2,869,687 | Keim et al. | Jan. 20, 1959 |